R. W. WELTY.
TIRE ARMOR.
APPLICATION FILED AUG. 12, 1908.
925,405.
Patented June 15, 1909.
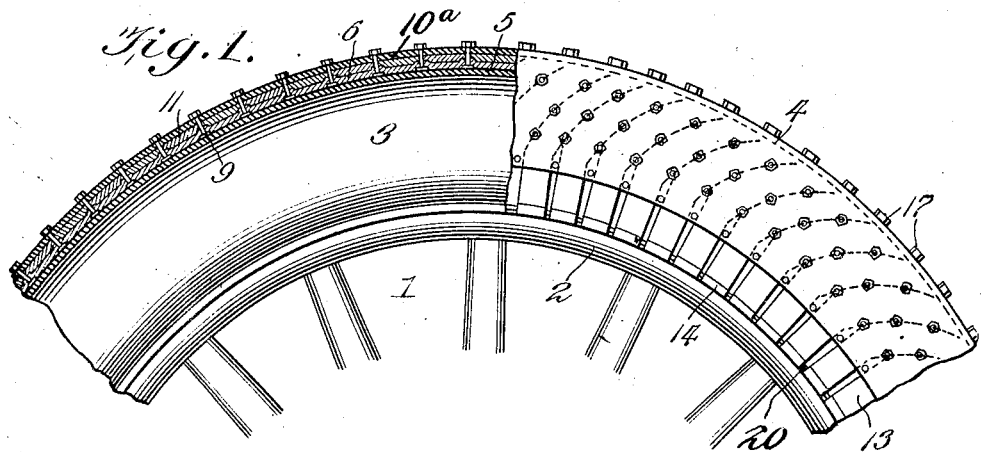
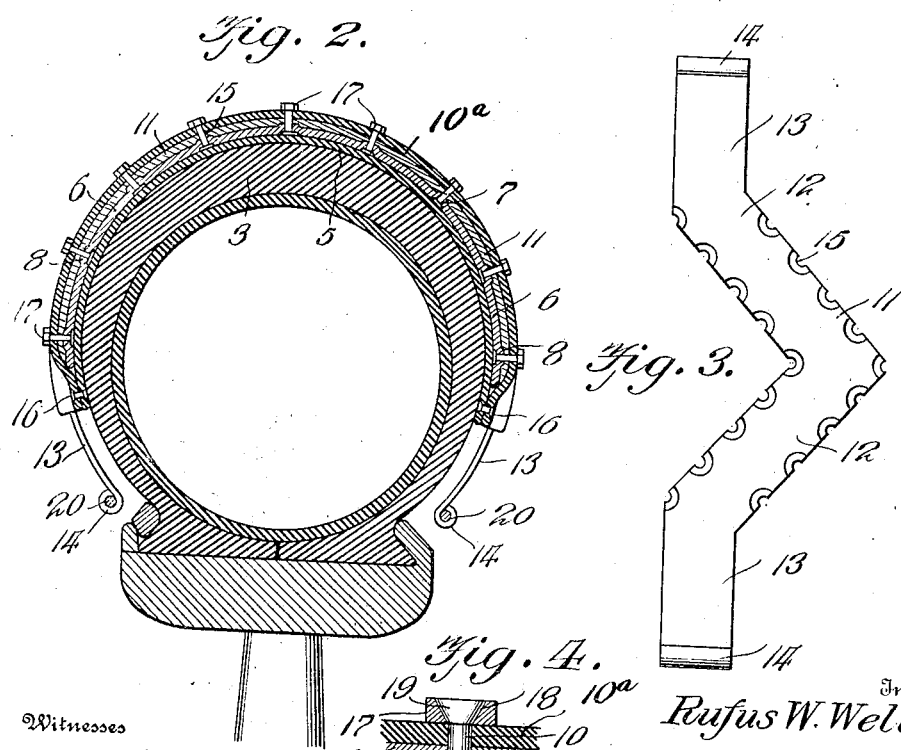
Witnesses
Frank B. Hofman
A. Allen
Inventor
Rufus W. Welty
By Victor J. Evans
Attorney

UNITED STATES PATENT OFFICE.

RUFUS W. WELTY, OF SAN FRANCISCO, CALIFORNIA.

TIRE-ARMOR.

No. 925,405.  Specification of Letters Patent.  Patented June 15, 1909.

Application filed August 12, 1908. Serial No. 448,213.

*To all whom it may concern:*

Be it known that I, RUFUS W. WELTY, a citizen of the United States, residing at San Francisco, in the county of San Francisco and State of California, have invented new and useful Improvements in Tire-Armor, of which the following is a specification.

This invention relates to automobile tire armors or protectors, and has for an object to provide an armor or protector that can be conveniently applied to automobile tires and which will effectively serve to prevent puncturing of the same.

A further object of the present invention is to provide a protector that can be applied to the tread of the tire and which will include means to prevent skidding and sliding as is common with the ordinary form of tire.

Other objects and advantages will be apparent as the nature of the invention is better disclosed, and changes within the scope of the claims may be resorted to without departing from the spirit of the invention.

In the drawings, forming a portion of the specification and in which like numerals of reference indicate similar parts in the several views; Figure 1 is a side view of a portion of an automobile wheel showing the application of the armor or protector thereto, parts being in section, Fig. 2 is a transverse sectional view, Fig. 3 is a plan view of one of the segments looking at the under side thereof, Fig. 4 is a detail sectional view through one of the studs showing its application to parts of the armor.

Referring now more particularly to the drawings, there is shown a portion of a vehicle wheel 1 having the usual rim 2 upon which is mounted a tire 3. The tire 3 in the present instance is of the clencher type, but the application of my invention is not directed particularly to this form of tire. The tire is provided with my improved armor or protector 4 which consists of a layer of canvas 5 which is treated with a non-absorbent preparation, and as shown, this layer 5 is curved transversely to conform to the curvature of the tire, and mounted upon this layer of canvas is shown an annular band 6 of spring steel or the like. The band 6, in diameter, is somewhat less than the layer 5 of canvas and its ends are thus disposed inwardly of the ends of said layer of canvas. The band has formed therein a plurality of passages 7, and portions of said band around said passages are pressed outwardly as shown at 8 to provide cups or cavities for the reception of heads 9 carried by studs 10. The studs 10 project radially from the tread and side portions of the tire 3, and their purpose will be hereinafter more fully referred to.

A plurality of spring steel members 11 are disposed upon the band 6, and these members are of substantially V-form and are curved transversely to conform to the curvature of the tire 3. The leg members 12 of the members 11 have formed integral therewith arms 13 having hooked ends 14, as shown. The edge portions of the legs 12 are provided with semicircular notches 15, and the notches in the legs of one member are thus adapted to aline with the notches formed in the legs of its adjacent member to form circular passages for the reception of the studs 10. A cover 10$^a$ of leather or rubber is located outwardly of the members 11 and receives the outer ends of the studs 10. The cover at its edges is riveted as indicated at 16 to the layer of canvas 5 previously described. The studs are provided at their outer ends with washers 17 in which are formed conical passages 18 for receiving correspondingly shaped heads 19 of the studs.

In assembling the washers and studs it may be mentioned that said studs are of an equal diameter throughout, leaving a portion projecting through the passages 18 formed in said washer, after which said portions may be mashed to form the conical heads 19, as shown in Fig. 4 of the drawings. The provision of the washers is such that they form heads at the outer ends of the studs to effectively engage the surface in the travel of the tire and prevent skidding or sliding as will be readily understood. The hooked ends 14 of the arms 13 are adapted to receive annular bands or rings 20 located outwardly of the rim of the wheel and effectively serve to retain the armor to the tire.

The armor as herein set forth and described is extremely simple in construction may be conveniently applied to automobile tires or the like and effectively prevents puncturing or mutilation of the tire as is apparent.

Having thus described the invention, what is claimed as new is:—

A tire armor comprising a band of spring material, a casing, a plurality of studs carried by the band, and a plurality of V-shaped members disposed in the casing and having their edges disposed between the shanks of said studs.

In testimony whereof I affix my signature in presence of two witnesses.

RUFUS W. WELTY.

Witnesses:
HARRY J. LASK,
H. L. TODD.